(12) United States Patent
Boyd et al.

(10) Patent No.: US 7,374,199 B2
(45) Date of Patent: May 20, 2008

(54) AIR BAG INFLATOR VIBRATION DAMPER

(75) Inventors: Ted Boyd, Knoxville, TN (US); Mike Strong, Knoxville, TN (US)

(73) Assignee: ARC Automotive, Inc., Knoxville, TN (US)

( * ) Notice: Subject to any disclaimer, the term of this patent is extended or adjusted under 35 U.S.C. 154(b) by 295 days.

(21) Appl. No.: 11/097,378

(22) Filed: Apr. 4, 2005

(65) Prior Publication Data

US 2006/0220353 A1  Oct. 5, 2006

(51) Int. Cl.
*B60R 21/16* (2006.01)
*B60R 21/20* (2006.01)

(52) U.S. Cl. .................... 280/728.2; 280/731
(58) Field of Classification Search ............. 280/728.1, 280/728.2, 731
See application file for complete search history.

(56) References Cited

U.S. PATENT DOCUMENTS

| | | | |
|---|---|---|---|
| 6,361,065 B1 | 3/2002 | Frisch | |
| 6,435,540 B1 | 8/2002 | Dürre | |
| 6,592,141 B1 | 7/2003 | Dancasius et al. | |
| 6,679,518 B2 | 1/2004 | Varcus et al. | |
| 6,712,383 B2 | 3/2004 | Asic et al. | |
| 7,172,208 B2* | 2/2007 | Lodholz et al. | 280/728.2 |
| 2003/0038459 A1 | 2/2003 | Liebach et al. | |
| 2003/0038462 A1 | 2/2003 | Leibach et al. | |
| 2003/0116948 A1 | 6/2003 | Back et al. | |
| 2004/0100078 A1 | 5/2004 | Schutz et al. | |
| 2004/0183278 A1 | 9/2004 | Lorenz et al. | |
| 2004/0232667 A1 | 11/2004 | Lodholz et al. | |

FOREIGN PATENT DOCUMENTS

| | | |
|---|---|---|
| DE | 19913120 | 9/2000 |
| DE | 19955427 | 6/2001 |
| EP | 1026050 | 8/2000 |
| EP | 1101662 | 5/2001 |
| EP | 1101663 | 5/2001 |
| EP | 1136328 | 9/2001 |
| GB | 2325900 | 12/1998 |

\* cited by examiner

*Primary Examiner*—Ruth Ilan
*Assistant Examiner*—Tiffany L. Webb
(74) *Attorney, Agent, or Firm*—Nixon & Vanderhye P.C.

(57) ABSTRACT

A vibration damper for connecting an inflator to an air bag module in a vehicle steering column or the like. The vibration damper comprises a flexible and resilient, annular damper member having a first end portion connected to a first ring member, and a second opposite end portion connected to a second ring member. The first ring member comprises an annular rim extending outwardly from the damper member and having an inwardly extending detent portion at its outer end that is constructed to be snap-fitted to an outwardly extending rim portion on the diffuser of the inflator. The second ring member is constructed to be connected to the air bag module.

21 Claims, 2 Drawing Sheets

AIR BAG INFLATOR VIBRATION DAMPER

BACKGROUND OF THE INVENTION

1. Field of the Invention

The present invention relates to a vibration damper for an airbag inflator and, more particularly, to such a vibration damper which is positioned between an inflator and an airbag module in a steering column of a motor vehicle.

2. Description of Related Art

The vibrations that arise in motor vehicles during movement or idling thereof with the motor running are, in many cases, transmitted to the steering column and then to the steering wheel. To dampen these vibrations at the steering wheel and to improve driving comfort, various types of vibration damper devices have been mounted within the steering column. In some cases, the vibration damper device has been integrated with the airbag inflator assembly mounted within the steering column and, in other cases, it has been separate therefrom.

Such vibration damper devices have been subject to one or more of the following disadvantages:

1. They have been complicated in construction;
2. They have been difficult to install;
3. They have been difficult and/or expensive to manufacture;
4. They have been unreliable in operation; and/or
5. They have occupied too much space in the steering column.

The vibration damper of the present invention is not subject to any of the above-mentioned disadvantages and possesses certain advantages that are not found in prior art damper devices of the same general type.

SUMMARY OF THE INVENTION

The vibration damper of the present invention comprises an annular, flexible and resilient damper member formed of any suitable material such as rubber, thermoplastic elastomers, or thermoset elastomers. The damper member may be in the form of a truncated cone, may be cylindrical, or may have any other suitable shape. It is attached at its end in any suitable manner to two substantially rigid ring members formed of any suitable material, e.g., a metal such as steel or aluminum. As an illustrative example, the damper member may be molded to the ring members.

One of the ring members comprises one or more inwardly extending detent portions that are adapted to be connected by a snap fit to the diffuser of an air bag inflator. The diffuser has an outwardly extending annular rim portion that is adapted to be snap-fitted within the one ring member in engagement with the detent portion or portions thereof so as to join the inflator to the damper.

The other ring member is in the form of a mounting flange of any suitable shape or construction for connecting the damper and inflator to the air bag module in the steering column. This damper construction allows the inflator some freedom of movement so as to dampen vibration in the steering column and to eliminate the need for a separate damper system within the steering column. Also, the damper of the present invention can be mounted or installed after the inflator assembly is completed to thereby alleviate any concern for the potential in some cases of Helium mass spec inaccuracy that may be caused by the presence of elastic material on the exterior of the inflator during the manufacture thereof.

DETAILED DESCRIPTION OF THE INVENTION

Figure 1:
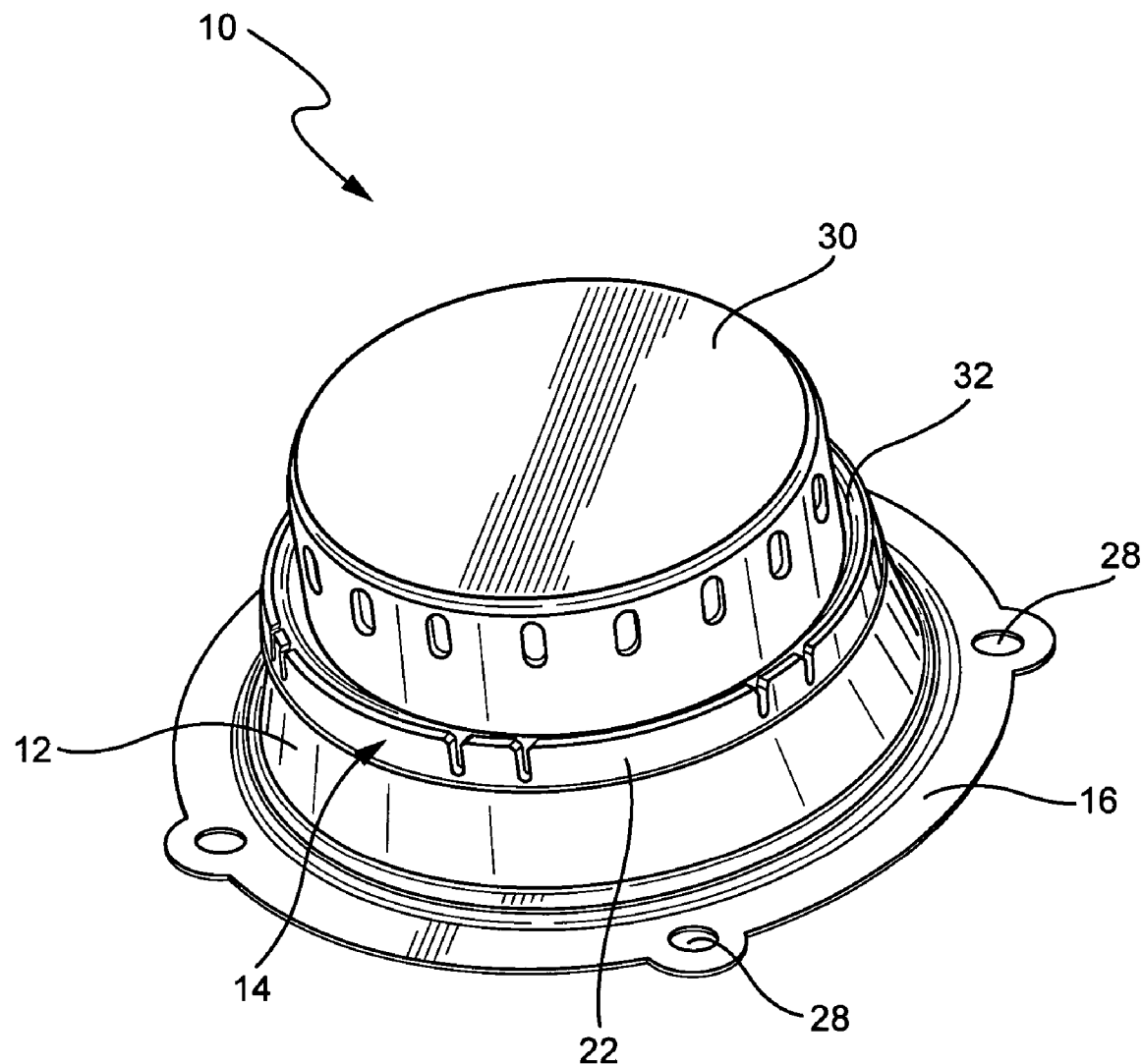
FIG. 1 is a perspective view of one embodiment of the vibration damper of the present invention.
Figure 2:
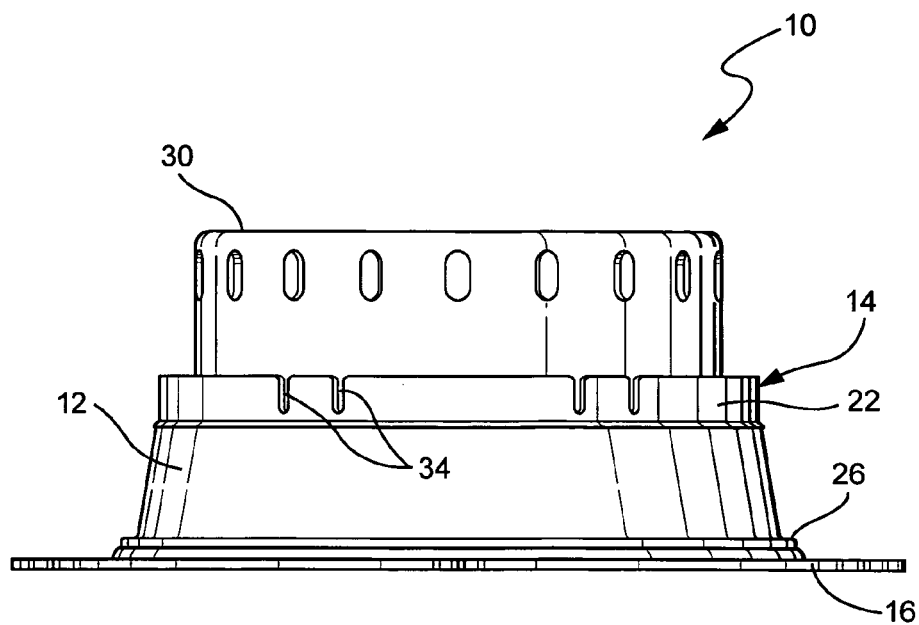
FIG. 2 is a side elevational view of the vibration damper shown in FIG. 1.
Figure 3:
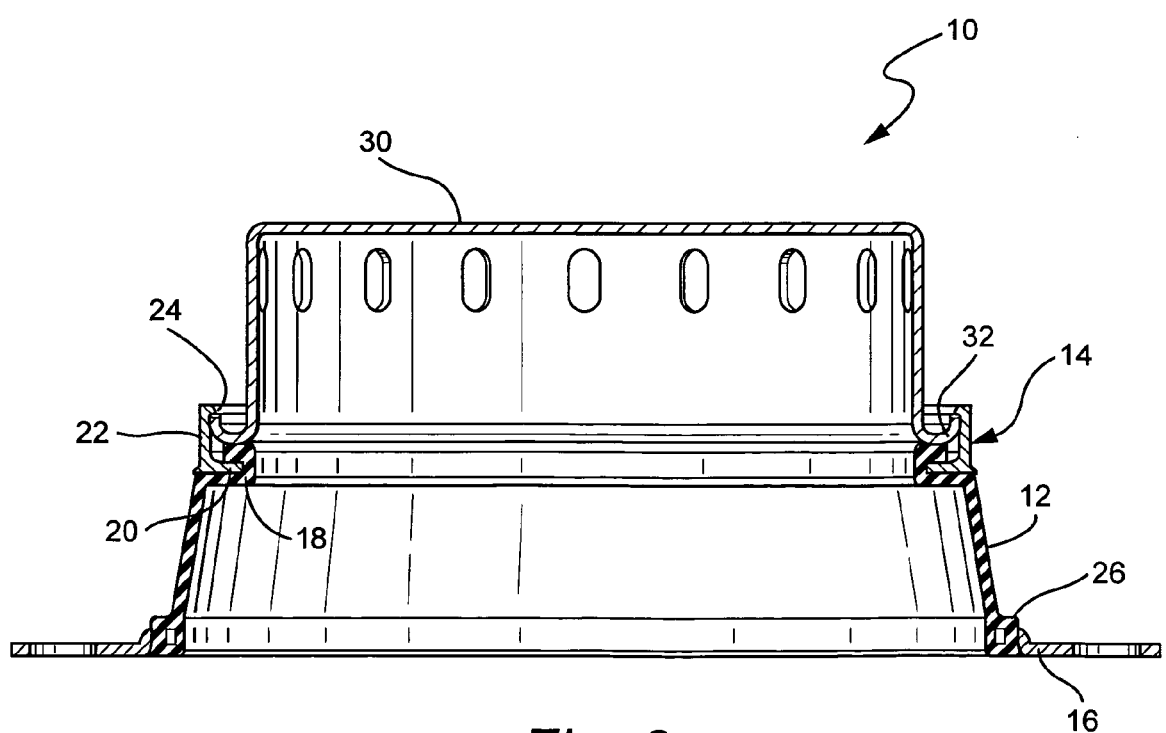
FIG. 3 is a side elevational view in section of the vibration damper shown in FIG. 1.

Referring to FIGS. 1-3, the vibration damper 10 of the present invention generally comprises an annular, flexible and resilient damper member 12 that is secured at its ends to first and second, substantially rigid ring members 14 and 16, respectively. The purpose of the vibration damper 10 is to connect an inflator to an air bag module in a motor vehicle steering column or the like for the purpose of allowing the inflator some freedom of movement so as to dampen vibration in the steering column.

As shown in FIGS. 2 and 3, the damper member 12 may be in the form of a truncated cone or may have any other suitable annular shape such as cylindrical. The damper member 12 may be formed of any suitable, flexible and resilient material such as rubber, thermoplastic elastomers, or thermoset elastomers.

At a first end portion 18, the damper member 12 is secured in any suitable manner to the first ring member 14 which is formed of any suitable substantially rigid material, e.g., a metal such as aluminum or steel, or a suitable plastic material such as nylon, glass filed nylon, polypropylene, or glass filled polypropylene. As shown in FIG. 3, the first ring member 14 comprises an inwardly extending annular flange 20 that is connected to the first end portion 18 of the damper member 12, and an axially extending annular rim 22, having a generally radially inwardly extending detent portion 24. The detent portion 24 may be continuous or may be formed in spaced sections. The damper member 12 is connected to the flange 20 of the first ring member 14 in any suitable manner, such as by molding.

The second end portion 26 of the damper member 12 is connected to the second ring member 16 in any suitable manner, such as by molding. The second ring member 16 is a mounting flange of any suitable shape and may have apertures 28 therethrough to facilitate its connection to an air bag module (not shown). The second ring member 16 may be formed of any suitable material, e.g., a metal such as aluminum or steel, or a suitable plastic such as nylon, polypropylene, or glass filled polypropylene.

The air bag inflator comprises a diffuser 30 of any suitable construction, having a generally radially outwardly extending annular rim portion 32 at its inner end that is adapted to the snap-fitted within the annular rim 22 of the first ring member 14 in engagement with the detent portion 24 thereof, as shown in FIG. 3. The rim portion 32 may be curved so that its inner end rests on the first end portion 18 of the damper member 12, and its outer edge portion engages the detent portion 24 of the first ring member 14. As shown in FIG. 3, the outer edge portion of the rim portion 32 of the diffuser 30 has an outer diameter that is approximately the same as the inner diameter of the rim 22 of the first ring member 14, thereby facilitating the snap-fitting of the first ring member 14 over the rim portion 32 and the engagement of the detent portion 24 with its outer edge to connect the diffuser 32 to the damper member 12. The rim portion 32 of the diffuser 30 may be continuous or may be formed in a plurality of spaced sections.

As shown in FIG. 2, the rim 22 of the first ring member 14 may be provided with one or more slots 34 therein to increase its flexibility and facilitate the snap-fitting of the damper member 12 to the diffuser 30.

From the foregoing description, it will be apparent that the present invention provides a simple and effective vibration damper that may be easily installed in a motor vehicle steering column to allow the inflator some freedom of movement relative to the air bag module, and thereby dampen vibration in the steering column.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vibration damper for connecting an inflator to an air bag module in a vehicle steering column or the like, said vibration damper comprising:
   a flexible and resilient annular damper member having a first end portion and a second opposite end portion;
   a first ring member connected to the first end portion of said damper member, said first ring member comprising an annular rim extending axially from said damper member and having an inwardly extending detent portion for snap-fitting engagement with an inflator; and
   a second ring member connected to the second end portion of said damper member, said second ring member being constructed to be connected to an air bag module.

2. The vibration damper of claim 1, wherein said damper member is in the shape of a truncated cone wherein said first end portion is smaller than said second end portion.

3. The vibration damper of claim 1, wherein said damper member is formed of rubber, thermoplastic elastomer, or thermoset elastomer.

4. The vibration damper of claim 1, wherein said annular rim of said first ring member is in alignment with the adjacent outer surface of said damper member.

5. The vibration damper of claim 4, wherein said first ring member has an inwardly extending annular flange on said rim, said flange being connected to said damper member.

6. The vibration damper of claim 5, wherein said first end portion of said damper member extends over said first ring member flange for engagement with an inflator to be snap-fitted to the vibration damper.

7. The vibration damper of claim 1, wherein said damper member is molded to said first ring member and to said second ring member.

8. The vibration damper of claim 1, wherein said first ring member and said second ring member are formed of a rigid material.

9. The vibration damper of claim 1, wherein said second ring member has a plurality of apertures therethrough to facilitate the connection of said second ring member to an air bag module.

10. An inflator for an air bag module in a vehicle steering column or the like, said inflator comprising:
    a diffuser having an outwardly extending annular rim portion at the inner end thereof;
    a vibration damper connected to said diffuser, said vibration damper comprising a flexible and resilient annular damper member having a first end portion and a second end portion, a first ring member connected to said first end portion, said first ring member comprising an annular rim extending axially from said damper member and having an inwardly extending detent portion that is in snap-fitting engagement with the rim portion of said diffuser, and a second ring member connected to said second end portion and constructed to be connected to an air bag module.

11. The inflator of claim 10, wherein said damper member is in the shape of a truncated cone wherein said first end portion is smaller than said second end portion.

12. The inflator of claim 10, wherein said damper is member is formed of rubber, thermoplastic elastomer, or thermoset elastomer.

13. The inflator of claim 10, wherein said annular rim of said first ring member is in alignment with the adjacent outer surface of said damper member.

14. The inflator of claim 13, wherein said first ring member has an inwardly extending annular flange on said rim, said flange being connected to said damper member.

15. The inflator of claim 14, wherein said first end portion of said damper member extends over said first ring member flange for engagement with the annular rim portion of said diffuser.

16. The inflator of claim 10, wherein said damper member is molded to said first ring member and to said second ring member.

17. The inflator of claim 10, wherein said first ring member and said second ring member are formed of a rigid material.

18. The inflator of claim 10, wherein said second ring member has a plurality of apertures therethrough to facilitate the connection of said second ring member to an air bag module.

19. The inflator of claim 10, wherein said annular rim of said first ring member has one or more slots therein to increase the flexibility thereof.

20. The inflator of claim 10, wherein said annular rim portion of said diffuser is curved and has an outer edge portion in engagement with said detent portion of said first ring member.

21. The inflator of claim 20, wherein said curved rim portion of said diffuser is in engagement with the first end portion of said damper member.

* * * * *